(12) United States Patent
Huang et al.

(10) Patent No.: US 9,143,959 B2
(45) Date of Patent: Sep. 22, 2015

(54) METHOD, APPARATUS AND SYSTEM FOR OPTIMIZING INTER-CELL INTERFERENCE COORDINATION

(75) Inventors: Weilan Huang, Beijing (CN); Yang Hu, Beijing (CN); Jie Mao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 185 days.

(21) Appl. No.: 13/885,305

(22) PCT Filed: Nov. 15, 2010

(86) PCT No.: PCT/CN2010/001824
§ 371 (c)(1),
(2), (4) Date: May 14, 2013

(87) PCT Pub. No.: WO2012/065279
PCT Pub. Date: May 24, 2012

(65) Prior Publication Data
US 2013/0229943 A1 Sep. 5, 2013

(51) Int. Cl.
*H04W 24/02* (2009.01)
*H04W 52/12* (2009.01)
*H04W 52/26* (2009.01)
*H04B 17/26* (2015.01)
*H04B 17/391* (2015.01)

(52) U.S. Cl.
CPC ............... *H04W 24/02* (2013.01); *H04B 17/26* (2015.01); *H04B 17/391* (2015.01); *H04W 52/12* (2013.01); *H04W 52/265* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2009/0252051 A1* | 10/2009 | Yu et al. | 370/252 |
| 2009/0268684 A1 | 10/2009 | Lott et al. | |
| 2010/0216405 A1* | 8/2010 | Bhadra et al. | 455/63.1 |
| 2010/0267408 A1 | 10/2010 | Lee et al. | |
| 2011/0218000 A1* | 9/2011 | Noh et al. | 455/501 |

FOREIGN PATENT DOCUMENTS

CN 101657976 A 2/2010
CN 101854725 A 10/2010

OTHER PUBLICATIONS

3rd Generation Partnership Project. 3GPP TS 36.423 V9.2.0 (Mar. 2010). 3rd Generation Partnership Project; Technical Specification Group Radio Access Network; Evolved Universal Terrestrial Radio Access Network (E-UTRAN); X2 application protocol (X2AP) (Release 9), Mar. 2010, pp. 1-120.

\* cited by examiner

*Primary Examiner* — Huy D Vu
*Assistant Examiner* — Hong Shao
(74) *Attorney, Agent, or Firm* — Murphy, Bilak & Homiller, PLLC

(57) ABSTRACT

The present invention proposes a method, a radio base station and a wireless communication system for optimizing Inter-cell Interference Coordination, wherein a user equipment is communicated within a cell served by the radio base station, comprising: obtaining one or more channel conditions on the communication channel between the user equipment and the radio base station, establishing a utility function as a function of Signal to Interference-and-Noise Ratios SINRs to model the user equipment's satisfaction level in terms of quality of service and power consumption based on the obtained channel conditions, selecting a SINR that enables to maximize the value of the utility function as a target SINR, and determining a transmit power to be used by the user equipment as a function of the target SINR. Thus, a self-optimized inter-cell interference coordination (ICIC) without X2 signaling between base stations is achieved and greedy power allocation is avoid.

10 Claims, 4 Drawing Sheets

METHOD, APPARATUS AND SYSTEM FOR OPTIMIZING INTER-CELL INTERFERENCE COORDINATION

TECHNICAL FIELD

The present invention relates generally to the field of wireless communication, and particularly to a method, apparatus, and system for optimizing Inter-Cell Interference Coordination (ICIC).

BACKGROUND

The 3rd Generation Partnership Project (3GPP) is responsible for the standardization of UMTS (Universal Mobile Telecommunication Service) and LTE (Long Term Evolution). LTE is a technology for realizing high-speed packet-based communication that can reach high data rates in both downlink and uplink, and is thought of as a next generation mobile communication system relative to UMTS. In order to support high data rates, LTE allows for a system bandwidth of up to 20 MHz. LTE is also able to operate in different frequency bands and can operate in at least FDD (Frequency Division Duplex) and TDD (Time Division Duplex). The modulation technique or the transmission method used in LTE is known as OFDM (Orthogonal Frequency Division Multiplexing).

For the next generation mobile communications system e.g. IMT-advanced (International Mobile Telecommunications) and/or LTE-Advanced, which is an evolution of LTE, support for bandwidths of up to 100 MHz is being discussed. In both LTE and LTE-Advanced, radio base stations are known as eNodeBs or eNodeBs, where "e" stands for evolved. Furthermore, multiple antennas with precoding/beamforming technology can be used in order to provide high data rates to user equipments. Thus, LTE and LTE-Advanced both constitute examples of MIMO (Multiple-Input, Multiple-Output) radio systems. Another example of a MIMO and OFDM based system is WiMAX (Worldwide Interoperability for Microwave Access).

In LTE, inter-cell interference mitigation is a key issue to potentially improve system performance for cell-edge UEs (User Equipments). LTE technologies include some mechanisms, such as inter-cell interference coordination (ICIC), for mitigating the interference between neighboring cells. The standardized ICIC schemes for Rel-8 of LTE primarily rely on frequency domain sharing between cells and adjustment of transmit powers. Signaling used for ICIC schemes is supported in X2 interface between eNodeBs for downlink and uplink respectively.

Proactive downlink ICIC schemes are facilitated via the standardized Relative Narrowband Transmit Power (RNTP) indicator. The RNTP is an indicator per physical resource block (PRB) signaled from an eNodeB to its neighboring eNodeBs over X2 interface, which indicates the maximum anticipated downlink transmit power level per PRB. Using RNTP, it is possible to dynamically configure different re-use patterns from full frequency re-use to hard frequency re-use 110, fractional frequency re-use 120 and soft frequency re-use 130 as illustrated in FIG. 1.

One proactive uplink ICIC mechanism is standardized based on a High Interference Indicator (HII). The HII is sent from an eNodeB to its neighboring eNodeBs with a single bit per PRB over the X2 interface, indicating whether its serving cell intends to schedule cell-edge UEs causing high inter-cell interference on those PRBs, i.e. select cell-edge UEs to transmit using those PRBs. The neighboring eNodeBs should then aim at scheduling UEs with low interference at those particular PRBs to avoid scheduling of cell-edge users on the same PRBs between two neighboring cells. Use of the HII mainly provides gain for fractional frequency re-use cases. Another reactive uplink ICIC scheme is based on an Overload Indicator (OI). Low, medium and high OI reports can be signaled over the X2 interface to neighboring cells based on the measurement information.

Furthermore, in LTE-Advanced, a new technology e.g. coordinated multiple points (CoMP) transmission/reception is introduced to potentially improve ICIC performance via coordinated scheduling/beamforming (CS/CB). CoMP technology is also regarded as an enhanced ICIC technology, however additional X2 signaling would be required to support CS/CB between eNodeBs. The details thereof are being discussed in 3GPP.

As described above, there are several mechanisms of ICIC in LTE and LTE-Advanced. However some problems exist in those mechanisms, which are listed as follows.

The ICIC schemes utilizing RNTP for downlink and HII/OI for uplink need to work over X2 interface to implicitly exchange inter-cell interference information between eNodeBs. Typically, the messages sent out over X2 interface are not so frequent. That means a dynamic ICIC, such as per-TTI ICIC, is very difficult to be supported to catch up with the changes of real-time interferences.

As described in FIG. 1, hard frequency re-use 110 and fractional frequency re-use 120 can well take care of the interferences, but they are at cost of spectrum efficiency. So, an appropriate soft frequency re-use with good ICIC will be desired. As such, further investigations are needed on how to implement a good ICIC and soft frequency re-use at the same time based on the mechanisms in Rel-8.

Although CoMP targets to enhance ICIC in a dynamic way, X2 signaling is still needed in order to implement CoMP. X2 messages need be frequently exchanged between eNodeBs and accordingly a lot of scheduling/beamforming related information needs to be carried. This will result in a big load and inefficient overhead over X2 interface.

In addition, existing ICIC mechanisms may cause greedy power selection, which greatly degrades system performance and meanwhile increases the power consumption. One example is shown in FIG. 2 that illustrates the inter-cell interferences on the uplink transmission, where two cell-edge UEs 220, 240 are served by their respective eNodeBs 210, 230. In order to maintain the proper communication between UEs 220, 240 and their respective eNodeBs 210, 230, the corresponding uplink SINR (signal to interference-and-noise ratio) at each eNodeB can be expressed as:

$$\text{For } UE\ 220: SINR_1 = \frac{H_{11} \cdot P_1}{H_{21} \cdot P_2 + N_1} > SINR_{target\_1}, \quad (1)$$

$$\text{For } UE\ 240: SINR_2 = \frac{H_{22} \cdot P_2}{H_{12} \cdot P_1 + N_2} > SINR_{target\_2}$$

where $P_i$ (i=1 or 2) is uplink transmit power of i-th UE, $N_j$ (j=1 or 2) is received noise at j-th eNodeB, $H_{i,j}$ denotes channel fading from i-th UE to j-th eNodeB. $SINR_i$ is measured and compared with pre-defined UE specific SINR target $SINR_{target\_i}$ to judge whether to trigger adjustment of uplink power allocation. In existing methods $SINR_{target}$ is set to be a fixed value for a UE without taking into considerations UE's specific channel condition and interference situation. Specifically, the solutions of $(P_1,P_2)$ that can satisfy the SINR requirements (Expression (1)) may not be exclusive, and instead multiple solutions may exist. That means vicious competition of power increase between UEs may result in a higher and higher interference, although solutions may exist to satisfy the SINR requirements for both UEs with lower transmit power and lower interference between each other. In other words, this conventional power control with fixed target SINR constraint could result in an undesirable competition of power increase among multiple UEs due to a high mutual interference. Hence, an enhanced method to tackle the problem in existing ICIC mechanisms with greedy power allocation and fixed target SINR is required to facilitate the cooperation of UE instead of competition in power selection.

SUMMARY

An object of the present invention is to provide an improved method, apparatus and system to obviate at least one of the above-mentioned disadvantages.

To this end, the present invention proposes to establish a utility function to model a UE's satisfaction, so as to dynamically determine a suitable target SINR and thus transmit power to adapt to its real-time channel condition. Here, a satisfaction level is used as a measure for rating the degree of UE's satisfaction.

According to a first aspect, the present invention provides a method optimizing Inter-cell Interference Coordination in a radio based station of a wireless communication system. In this wireless communication system, a user equipment is located in a cell served by the radio base station. The method comprises obtaining one or more channel conditions on the communication channel between the user equipment and the radio base station, establishing a utility function as a function of Signal to Interference-and-Noise Ratios SINRs to model the user equipment's satisfaction level in terms of quality of service and power consumption based on the obtained channel conditions, selecting a SINR that enables to maximize the value of the utility function as a target SINR, and determining a transmit power to be used by the user equipment as a function of the target SINR.

According to a second aspect, establishing the utility function comprises defining a QoS utility function as a function of SINR to model the user equipment's satisfaction level with SINRs for respective QoS requirements, and defining a power cost function as a function of SINR to model the user equipment's satisfaction level with SINRs for respective power consumptions based on the obtained channel condition, where the channel conditions comprises noise, inter-cell interference and channel gain, and establishing the utility function as the difference between the QoS utility function and the power cost function. In this case, a SINR that maximizes the value of the difference is selected as the target SINR. Preferably, if all values of the difference are lower than a predefined threshold, the transmit power is determined to be zero.

According to a third aspect, the QoS utility function is a Sigmoid function $U_{QoS}(SINR)$ and is defined as:

$$U_{QoS}(SINR) = \frac{\frac{1}{1+e^{-a(SINR-b)}} - \frac{1}{1+e^{ab}}}{1 - \frac{1}{1+e^{ab}}}$$

and the power cost function $U_p(SINR)$ is a liner function and is defined as:

$$U_P(SINR) = k \cdot P = k \cdot \frac{N+I}{H} \cdot SINR,$$

and the utility function is established as the difference between the Sigmoid function and the linear function as follows:

$$U(SINR) = \frac{\frac{1}{1+e^{-a(SINR-b)}} - \frac{1}{1+e^{ab}}}{1 - \frac{1}{1+e^{ab}}} - k \cdot \frac{N+I}{H} \cdot SINR$$

where N, I and H denote noise, interference and channel gain on the communication channel, respectively.

Preferably, the channel condition, e.g. the $$\frac{N+I}{H}$$

is obtained by CQI measurements. A Modulation Coding Scheme is selected based on the target SINR.

According to the present invention, said wireless communication system is preferably a Long Term Evolution system or a Long Term Evolution-Advanced system and said base station is preferably eNodeB.

The present invention also provides a radio base station for optimizing Inter-cell Interference Coordination in a wireless communication system. In this wireless communication system, a user equipment is located in a cell served by the radio base station. The radio base station comprises: obtaining unit for obtaining one or more channel conditions on the communication channel between the user equipment and the radio base station, utility function establishing unit for establishing a utility function as a function of Signal to Interference-and-Noise Ratios SINRs to model the user equipment's satisfaction level in terms of quality of service and power consumption based on the obtained channel conditions, target SINR selecting unit for selecting a SINR that enables to maximize the value of the utility function as a target SINR, and transmit power determining unit for determining a transmit power to be used by the user equipment as a function of the target SINR.

The present invention also provides a wireless communication system comprising the above radio base station.

Since according to the present invention, a utility function based method is applied to model the UE's satisfaction level by considering current channel condition, in which the transmit power and target SINR are dynamically determined to adapt to UE's real-time channel condition. As a result, the mutual interference is reduced by avoiding the vicious competition of power increase. Since the proposed method is distributed, so X2 signaling is not required between eNodeBs and hence the issues of X2 overhead and information exchange latency are well resolved. As such, a self-optimized ICIC method without X2 signaling is provided, which improves system performance by enabling to utilize the multi-user diversity as well as reduce the mutual interference.

The present invention could be applied to both TDD and FDD systems in both downlink (DL) and uplink (UL) situations, and is also suitable for both single-antenna and MU- MIMO (Multi-User Multiple Input Multiple Output) cases. The present invention is also applicable for all other inter-cell and intra-cell interference problem in wireless communication systems.

BRIEF DESCRIPTION OF THE DRAWINGS

The foregoing and other objects, features, and advantages of the present invention will become more apparent from the following description of preferred embodiments and accompany drawings.

DETAILED DESCRIPTION

In the following description, for purposes of explanation rather than limitation, specific details, such as the particular architecture, interfaces, techniques, etc., are set forth for illustration. However, it will be apparent to those of ordinary skill in the art that other embodiments that depart from these specific details would still be understood to be within the scope of the present invention. Moreover, for the purpose of clarity, detailed descriptions of well-known devices, circuits, and methods are omitted so as not to obscure the description of the present invention. It should be expressly understood that the drawings are included for illustrative purposes and do not represent the scope of the present invention. In the accompanying drawings, like reference numbers in different drawings may designate similar elements.

The concept of utility has been widely used in microeconomics. Utility often represents satisfaction level the decision-maker receives as a result of his/her actions.

As known in the art, QoS (Quality-of-Service) is an important factor for reflecting or predicting the subjectively experienced quality of a wireless communication. Improving QoS is always desired in a wireless communication network. Generally, a high SINR will imply a high service quality, but a high SINR often requires high transmit power. Power is a valuable commodity from a perspective of user equipment. Hence, when determining an appropriate transmit power, both QoS and power consumption should be considered.

According to the present invention, to optimizing ICIC, a utility function is established as a function of SINRs to model a user equipment's satisfaction level so as to determine a transmit power that maximizes such satisfaction level by taking current channel conditions into account, which utility function accommodates both factors, i.e. QoS and power consumption.

Figure 1:
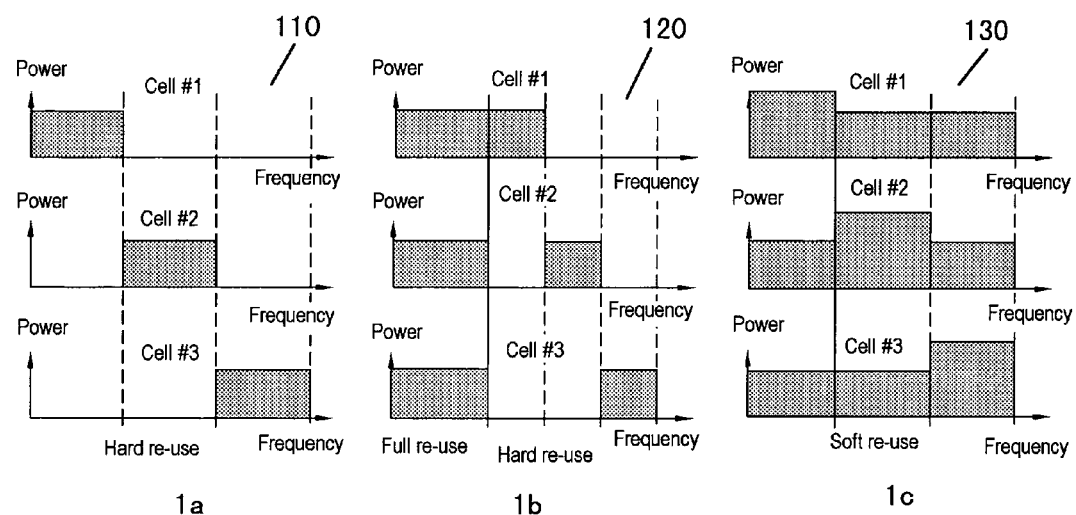
FIG. 1 illustrates different frequency re-use patterns based on RNTP.
Figure 2:
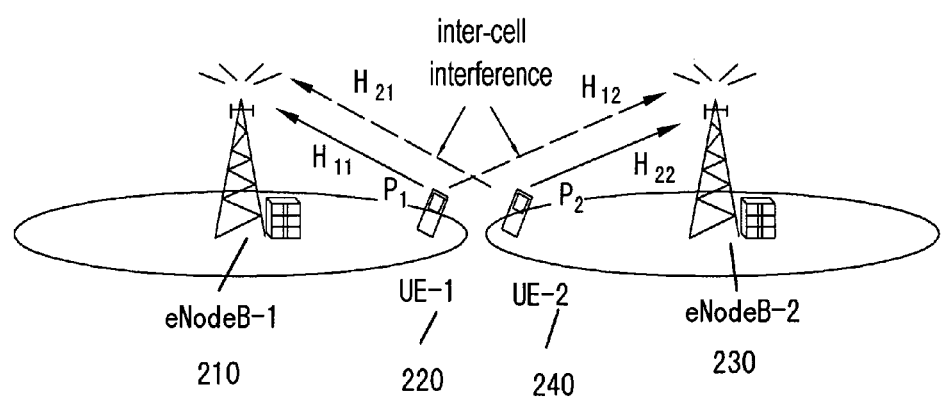
FIG. 2 illustrates a wireless communication system using uplink ICIC.
Figure 3:
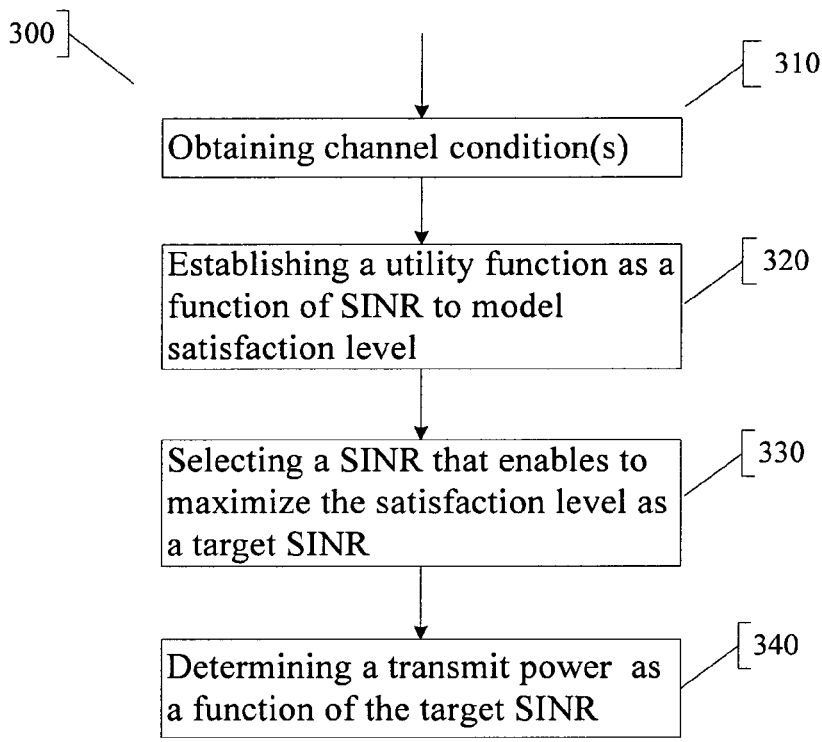
FIG. 3 is a flow chart illustrating a method according to an embodiment of the present invention.

FIG. 3 illustrates a flow chart of a method 300 for optimizing ICIC according to an embodiment of the present invention. For the sake of simplicity, the method 300 is illustrated in the context of the wireless communication system 200 shown in FIG. 2. As will be appreciated, although FIG. 2 shows only two eNodeBs and two UEs, there may be any number of network nodes.

The wireless communication system 200 may be a LTE system, or a LTE-Advanced system. The wireless communication system may also be a TDD or FDD system. In this wireless communication system, single-antenna or MU-MIMO schemes may be adopted.

In the wireless communication system 200 as showed in FIG. 2, UEs 220, 240 are respectively located in the cells served by eNodeBs 210, 230. Specially, UEs 220, 240 are e.g. both cell-edge UEs, so the communication between UE 220 and eNodeB 210 may interfere with the communication between UE 240 and eNodeB 230, and vise versa. That is, inter-cell interferences exist in this situation. The eNodeBs 210, 230 will monitor the SINRs they received and perform power control or power allocation to mitigate the inter-cell interference when necessary. When eNodeB 210 is to perform power control for UE 220, in step 310, one or more channel conditions on the communication channel between eNodeB 210 and UE 220 are obtained. Then, in step 320, a utility function U(SINR) is established as a function of SINR based on the obtained channel conditions. The utility function models UE 220's satisfaction level in both QoS and power consumption aspects for respective SINRs.

According to one embodiment of the present invention, the utility function is established based on a QoS utility function $U_{QoS}(SINR)$ and a power cost function $U_P(SINR)$ of received SINR. The QoS utility function models the UE 220's satisfaction level for respective QoS that is parameterized by SINR. Preferably, the QoS utility function may be predefined for UE 220 and stored in eNodeB 210. The power cost function models satisfaction level with certain SINRs for respective power consumptions by taking current channel condition into account. According to an embodiment, the utility function U(SINR) is established as the difference between the QoS utility function and the power cost function, that is, $U(SINR)=U_{QoS}(SINR)-U_P(SINR)$.

After establishing the utility function, in step 330, a target SINR is determined by finding a SINR that enables to maximize the satisfaction level modeled by the utility function, that is, a SINR that enables to maximize the value of the utility function is selected as the target SINR. Preferably, in case the utility function is established as the difference between the QoS utility function and the power cost function, the target SINR is selected to be the SINR that maximizes the value of the difference. A maximum value of the difference represents a maximum satisfaction level.

Upon selection of the target SINR, in step 340, a transmit power to be used by UE 220 may be determined as a function of the target SINR. Preferably, the determination of the transmit power is also dependent on one or more channel conditions. In uplink case, eNodeB 210 will inform UE 220 of the determined transmit power.

With such a smart distributed method, the transmit power is independently determined for each UE without being straightforwardly influenced by other UEs' behaviors. Such a selected target SINR and then the determined transmit power would reflect a good tradeoff between QoS and power consumption, that is, UE 220 may satisfies with the QoS while the transmit power will be set at an appropriate level. As a result, a greedy power allocation will be avoided and ICIC between cells are optimized.

Figure 4:
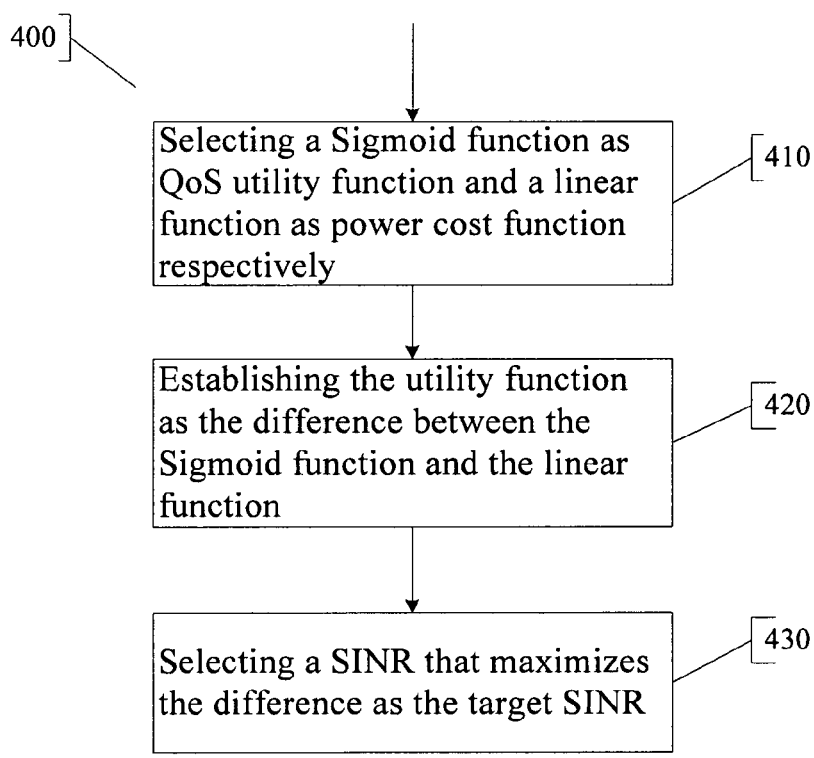
FIG. 4 is a flow chart illustrating a method according to another embodiment of the present invention.

FIG. 4 illustrates a flow chart of a method 400 for optimizing ICIC according to another embodiment of the present invention. Again, the method is illustrated in the context of the wireless communication system 200 as shown in FIG. 2.

The QoS utility function may be predefined and/or selected from a group consisting of sigmoid function, a convex function, or a concave function etc to reflect the UE's satisfaction level in connection with QoS. Preferably, considering a case in which UE's satisfaction level grows slowly when the service quality is low and tends to saturation when the service quality is good enough, the QoS utility function may be selected as a sigmoid function to better reflect such variations of the UE's satisfaction level.

Power consumption is generally assumed to linearly increase as the SINR increases, and then the power cost function may be selected as a linear function. Preferably, an importance factor may be introduced in the power cost function to indicate the importance of power from UE's view.

According to an embodiment of the present invention, in step 410, a sigmoid function is selected as QoS utility function and a linear function are selected as the power cost function. Preferably, the shape of the sigmoid QoS utility function may vary with such as traffic types, e.g. voice, video or data, transmitted on the communication channel etc. The slope of the linear power cost function may vary depending on the channel conditions on the wireless communication channel, which channel conditions for example include channel gain and the real-time noise, inter-cell interference, i.e. interference from other cells etc.

Then, in step 420, the utility function is established as the difference between the sigmoid QoS utility function and the linear power cost function.

In step 430, a SINR that maximizes the difference is selected as the target SINR. The target SINR is then used to determine the transmit power to be used.

In an example, the sigmoid QoS utility function may be expressed as:

$$U_{QoS}(SINR) = \frac{\frac{1}{1+e^{-a(SINR-b)}} - \frac{1}{1+e^{ab}}}{1 - \frac{1}{1+e^{ab}}} \quad (2)$$

where a and b are constant parameters, they could be used to adjust the steepness and the center of the Sigmoid QoS utility function and may be determined by for example the traffic type transmitted on the communication channel. According to an embodiment, a and b are QoS-based parameters. The sigmoid QoS utility function is of a value within the range [0, 1).

The linear power cost function may be expressed as:

$$U_P(SINR) = k \cdot P \quad (3)$$
$$= k \cdot \frac{N+I}{H} \cdot SINR$$

where k is a constant that characterizes the importance of the power consumption from the user's viewpoint and may be a QoS based parameter, and N, I and H denote the noise, interference, especially inter-cell interference and channel gain on the wireless communication channel between eNodeB 210 and UE 220, respectively.

$$\frac{N+I}{H}$$

represents the channel condition on the communication channel. Preferably, the channel condition may be obtained in practical wireless communication systems, e.g., by CQI measurements.

Figure 5:
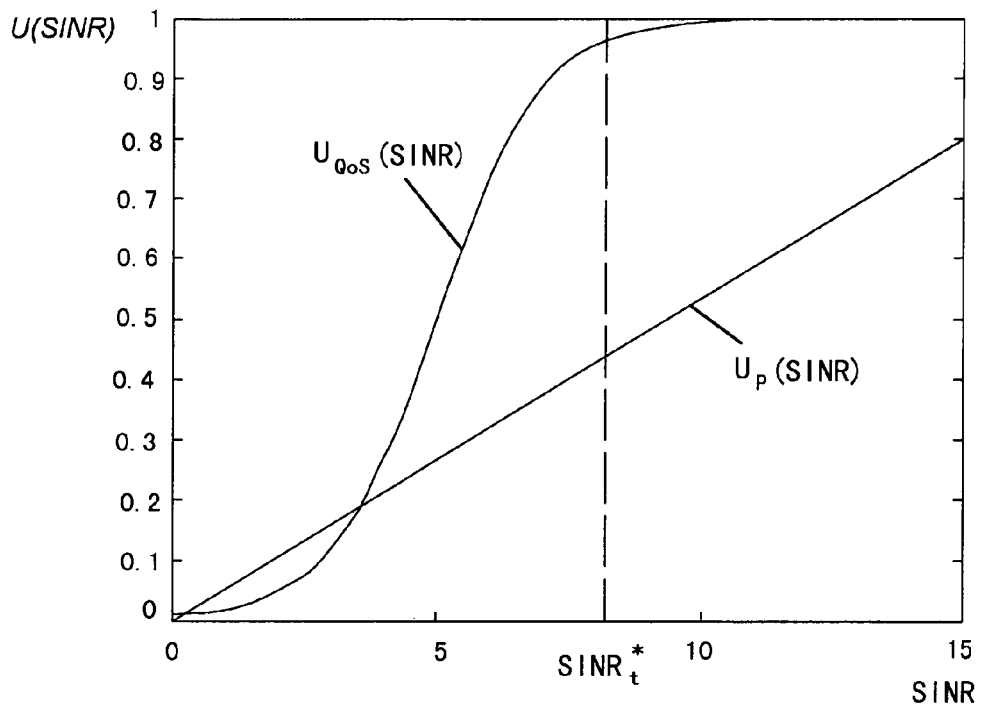
FIG. 5 illustrates a utility function according to the present invention.

Such defined $U_{QoS}(SINR)$ and $U_P(SINR)$ are plotted in FIG. 5. As shown in FIG. 5, the sigmoid QoS utility function well defines the variation of $U_{QoS}(SINR)$, that is, when SINR is below a certain level or tends to saturation, $U_{QoS}(SINR)$ grows slowly. FIG. 5 also shows that the slope of the linear power cost function $U_P(SINR)$ with respect to SINR may depend on the channel condition including real-time interference and channel gain, which may dynamically change. The slope of the linear power cost function will increase as the interference increases.

In contrast to use of fixed target SINR in conventional method, according to the present invention, by adopting a utility function to model the UE's satisfaction level, a target SINR would be dynamically determined to adapt to the real-time channel conditions. As shown in FIG. 5, a target SINR i.e. $SINR_{target}^*$, is selected so as to maximize U(SINR), which results in the largest difference between the two curves presenting $U_{QoS}(SINR)$ and $U_P(SINR)$, i.e., $$SINR_{target}^* = \arg \max U(SINR) \quad (4)$$

With this selected $SINR_{target}^*$ an appropriate Modulation and Coding Scheme (MCS) could be selected and the transmit power could be determined as a function of the selected $SINR_{target}^*$ accordingly. Preferably, the transmit power is calculated as:

$$P_t^* = \frac{N+I}{H} SINR_{target}^* \quad (5)$$

The described method above can jointly decide the transmit power and MCS based on a suitable target SINR determined depending on real-time channel condition. As a result an optimized ICIC is achieved by avoiding the vicious competition of power increase and omitting the need for X2 signaling.

Figure 6:
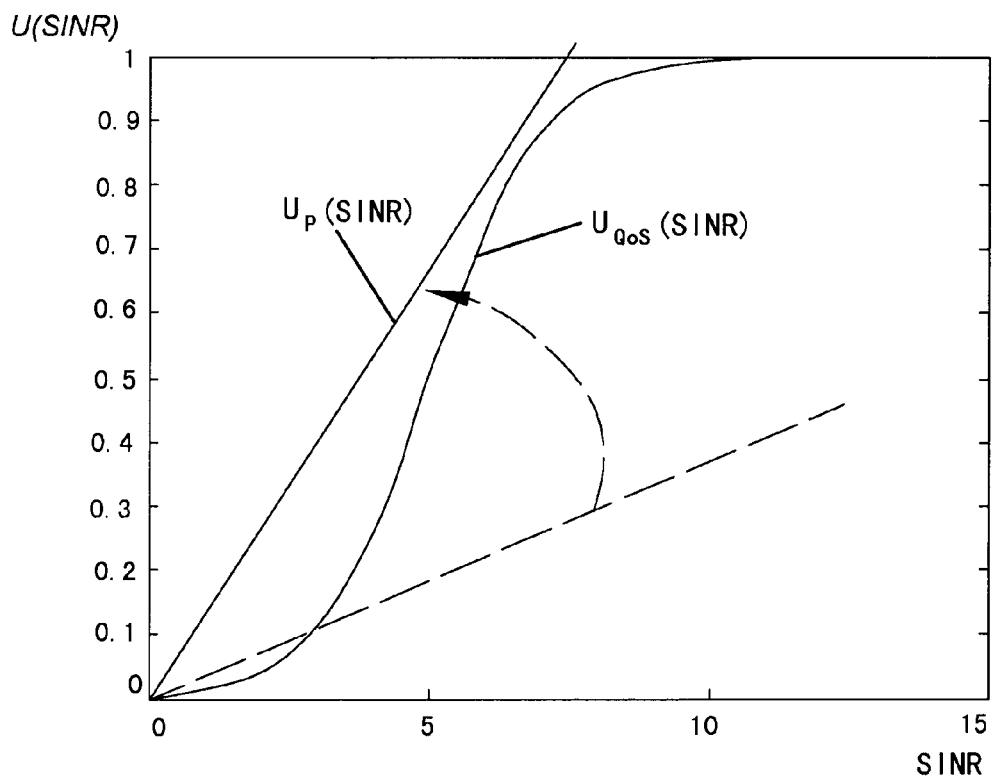
FIG. 6 illustrates a UE power turn-off case.

It should be noticed in such cases that the interference is extreme high, there also exists possibility that the optimal selection of transmit power is zero, i.e., in such cases the UE will choose to turn off the power. Such a situation is illustrated in FIG. 6, the slop of the power cost function increases when the interference increases, in this case, the utility function will indicate that UE will be unsatisfactory with all SINRs, then no SINR will be selected as the target SINR. In this case, UE will stop transmitting on the communication channel and choose to turn off the power.

Figure 7:
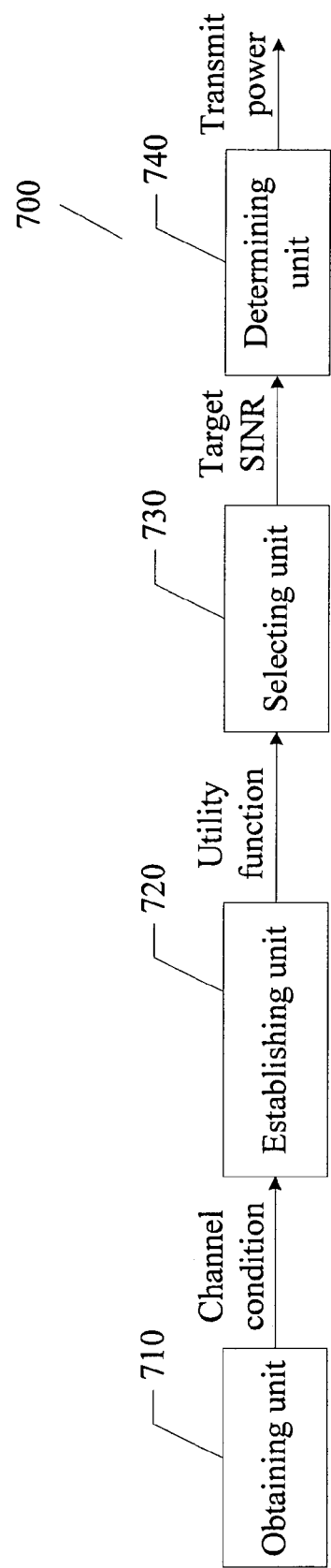
FIG. 7 is a block diagram illustrating a radio base station according to an embodiment of the present invention.

FIG. 7 illustrates a block diagram of a radio base station 700 for implementing the method according to the present invention.

The radio base station 700 comprises obtaining unit 710, utility function establishing unit 720, target SINR selecting unit 730 and transmit power determining unit 740 that operatively coupled together.

When performing ICIC in a wireless communication system, obtaining unit 710 may obtain channel condition on a communication channel between the radio base station and UE. Preferably, the obtaining unit 710 obtains the channel condition by CQI measurement feedback by e.g. UE. Utility function establishing unit 710 may establish a utility function to model UE's satisfaction level as a function of SINR in terms of quality of service QoS and power consumption based on the obtained channel conditions. Power consumption for a certain SINR is determined by real-time channel conditions including noise, interferences and channel gain etc. on the wireless communication channel. Target SINR Selecting unit 720 may select a SINR that renders the established utility function to reach its maximum value as a target SINR. In other words, a selected target SINR would result in the highest satisfaction level of the UE from both QoS and power consumption perspective. Transmit power determining unit 730 may determine a transmit power based on the target SINR. Preferably, the transmit power may be calculated as $$P_t^* = \frac{N+I}{H} SINR_{target}^*.$$

This radio base station 700 is preferably eNodeB for performing ICIC in a LTE system or LTE-Advanced system. Preferably, the wireless communication system could also be TDD or FDD system.

The present invention relates to interference coordination mechanism at both radio base station and UE sides. In the present invention, a utility-based self-optimized ICIC method is proposed to improve the system performance in interference-limited environment, e.g. strong interference environment. The present invention enables easy implementation and low complexity of target SINR and transmit power determination. Although the present invention is discussed based on the Evolved Universal Terrestrial Radio Access (E-UTRA) system (which is also commonly referred to as the Long-Term Evolution (LTE)) of the widely deployed WCDMA systems, the skilled in the art will appreciate that the present invention is also applicable to both TDD and FDD single-antenna and MU-MIMO cases, to both UL and DL multiple interferers cases, to X2 signaling non-existence cases, to energy-saving green system. And the present invention is also applicable to implementation of joint transmit power control and MCS adaptation As will be appreciated by one of skill in the art, the present invention may be embodied as a method, apparatus, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

ABBREVIATIONS

LTE Long term evolution
LTE-A LTE-Advanced
E-UTRAN Evolved Universal Terrestrial Access Network
WiMAX Worldwide Interoperability for Microwave Access system
TDD time division duplex
FDD frequency division duplex
SINR signal to interference-and-noise ratio
QoS Quality-of-Service
MCS Modulation and Coding Scheme
MIMO multiple-input multiple-output
ICIC inter-cell interference coordination
RNTP relative narrowband transmit power
HII high interference indicator
OI Overload indicator
CoMP coordinated multiple points
CS coordinated scheduling
CB coordinated beamforming
PRB physical resource block
UE User equipment

The invention claimed is:

1. A method of optimizing Inter-cell Interference Coordination in a radio base station of a wireless communication system, wherein a user equipment is located in a cell served by the radio base station, the method comprising:
    obtaining one or more channel conditions on the communication channel between the user equipment and the radio base station;
    establishing a utility function as a function of Signal to Interference-and-Noise Ratios (SINRs) to model the user equipment's satisfaction level in terms of Quality of Service (QoS) and power consumption, based on the obtained channel conditions,
    wherein the step of establishing comprises:
        defining a QoS utility function as a function of SINR to model the user equipment's satisfaction level with SINRs for respective QoS requirements, and defining a power cost function as a function of SINR to model the user equipment's satisfaction level with SINRs for respective power consumptions, based on the obtained channel conditions, where the channel conditions comprise noise, inter-cell interference and channel gain,
    wherein the QoS utility function is a Sigmoid function $U_{QoS}(SINR)$ and is defined as:

$$U_{QoS}(SINR) = \frac{\frac{1}{1+e^{-a(SINR-b)}} - \frac{1}{1+e^{ab}}}{1 - \frac{1}{1+e^{ab}}},$$

where a, b are QoS based parameters, and
the power cost function $U_p(SINR)$ is a linear function and is defined as:

$$U_P(SINR) = k \cdot P = k \cdot \frac{N+I}{H} \cdot SINR,$$

where N, I and H denote noise, interference and channel gain on the communication channel, respectively, and k characterizes the importance of the power consumption from the viewpoint of the user equipment, and the utility function is established as the difference between the Sigmoid function and the linear function as follows:

$$U(SINR) = \frac{\frac{1}{1+e^{-a(SINR-b)}} - \frac{1}{1+e^{ab}}}{1 - \frac{1}{1+e^{ab}}} - k \cdot \frac{N+I}{H} \cdot SINR.$$

selecting a SINR that maximizes the value of the difference, as a target SINR; and determining a transmit power to be used by the user equipment as a function of the target SINR.

2. The method according to claim 1, wherein the step of determining comprises if all values of the difference are lower than a predefined threshold, determining the transmit power to be zero.

3. The method according to claim 1, wherein the step of obtaining comprises obtaining the channel conditions by CQI measurements.

4. The method according to claim 1, wherein a Modulation and Coding Scheme (MCS) is selected based on the target SINR.

5. A method according to claim 1, wherein said wireless communication system is a Long Term Evolution system or a Long Term Evolution-Advanced system and said radio base station is eNodeB.

6. A radio base station for optimizing Inter-cell Interference Coordination in a wireless communication system, wherein a user equipment is located in a cell served by the radio base station, the radio base station comprising:

an obtaining unit for obtaining channel conditions on the communication channel between the user equipment and the radio base station;

a utility function establishing unit for establishing a utility function as a function of Signal to Interference-and-Noise Ratios (SINRs), to model the user equipment's satisfaction level in terms of Quality of Service (QoS) and power consumption based on the obtained channel conditions wherein the utility function establishing unit is configured to:

define a QoS utility function as a function of SINR to model the user equipment's satisfaction level with SINRs for respective QoS requirements, and defining a power cost function as a function of SINR to model the user equipment's satisfaction level with SINRs for respective power consumptions, based on the obtained channel conditions, where the channel conditions comprise noise, inter-cell interference and channel gain, wherein the QoS utility function is a Sigmoid function $U_{QoS}(SINR)$ and is defined as:

$$U_{QoS}(SINR) = \frac{\frac{1}{1+e^{-a(SINR-b)}} - \frac{1}{1+e^{ab}}}{1 - \frac{1}{1+e^{ab}}},$$

where a, b are QoS based parameters, and the power cost function $U_p(SINR)$ is a linear function and is defined as:

$$U_P(SINR) = k \cdot P = k \cdot \frac{N+I}{H} \cdot SINR,$$

where N, I and H denote noise, interference and channel gain on the communication channel, respectively, and k characterizes the importance of the power consumption from the viewpoint of the user equipment, and the utility function is established as the difference between the Sigmoid function and the linear function as follows:

$$U(SINR) = \frac{\frac{1}{1+e^{-a(SINR-b)}} - \frac{1}{1+e^{ab}}}{1 - \frac{1}{1+e^{ab}}} - k \cdot \frac{N+I}{H} \cdot SINR;$$

a target SINR selecting unit for selecting a SINR that maximizes the value of the difference, as a target SINR, and a transmit power determining unit for determining a transmit power to be used by the user equipment as a function of the target SINR.

7. The radio base station according to claim 6, wherein the transmit power determining unit is configured to determine the transmit power to be zero if all values of the differences are lower than a predefined threshold.

8. The radio base station according to claim 6, wherein the obtaining unit is configured to obtain the channel conditions by CQI measurements.

9. The radio base station according to claim 6, wherein a Modulation and Coding Scheme (MCS) is selected based on the target SINR.

10. The radio base station according to claim 6, wherein said wireless communication system is a Long Term Evolution (LTE) system or a Long Term Evolution-Advanced (LTE-Advanced) system, and said radio base station is an eNodeB.

* * * * *

UNITED STATES PATENT AND TRADEMARK OFFICE
CERTIFICATE OF CORRECTION

| | |
|---|---|
| PATENT NO. | : 9,143,959 B2 |
| APPLICATION NO. | : 13/885305 |
| DATED | : September 22, 2015 |
| INVENTOR(S) | : Huang et al. |

It is certified that error appears in the above-identified patent and that said Letters Patent is hereby corrected as shown below:

Specification

In Column 8, Line 59, delete "establishing unit 710" and insert -- establishing unit 720 --, therefor.

In Column 8, Lines 65-66, delete "Selecting unit 720" and insert -- Selecting unit 730 --, therefor.

In Column 9, Lines 3-4, delete "determining unit 730" and insert -- determining unit 740 --, therefor.

Claims

In Column 11, Line 12, in Claim 1, delete "SINR." and insert -- SINR; --, therefor.

In Column 11, Line 30, in Claim 5, delete "A method" and insert -- The method --, therefor.

In Column 11, Line 46, in Claim 6, delete "conditions" and insert -- conditions, --, therefor.

Signed and Sealed this
Fourteenth Day of June, 2016

Michelle K. Lee
*Director of the United States Patent and Trademark Office*